United States Patent
Lin et al.

(10) Patent No.: US 10,628,656 B2
(45) Date of Patent: Apr. 21, 2020

(54) IMAGE CAPTURE APPARATUS

(71) Applicant: Gingy Technology Inc., Hsinchu (TW)

(72) Inventors: Patrick Lin, Hsinchu (TW);
Chiung-Han Wang, Hsinchu (TW);
Pi-Hui Lin, Hsinchu (TW); Wen-Chen Lee, Hsinchu (TW); Jen-Chieh Wu, Hsinchu (TW)

(73) Assignee: Gingy Technology Inc., Hsinchu (TW)

( * ) Notice: Subject to any disclaimer, the term of this patent is extended or adjusted under 35 U.S.C. 154(b) by 0 days.

(21) Appl. No.: 16/261,184

(22) Filed: Jan. 29, 2019

(65) Prior Publication Data
US 2019/0156096 A1    May 23, 2019

Related U.S. Application Data

(63) Continuation-in-part of application No. 15/960,518, filed on Apr. 23, 2018, now Pat. No. 10,489,631, (Continued)

(30) Foreign Application Priority Data

Oct. 19, 2015 (TW) .............................. 104134209 A
Mar. 17, 2017 (CN) ..................... 2017 2 0260844 U
Feb. 1, 2018 (CN) ..................... 2018 2 0172161 U

(51) Int. Cl.
*G06K 9/00* (2006.01)
*G02B 6/42* (2006.01)
*F21V 8/00* (2006.01)

(52) U.S. Cl.
CPC ............. *G06K 9/0004* (2013.01); *G02B 6/42* (2013.01); *G02B 6/4206* (2013.01); *G02B 6/4214* (2013.01); *G02B 6/0026* (2013.01)

(58) Field of Classification Search
None
See application file for complete search history.

(56) References Cited

U.S. PATENT DOCUMENTS 9,754,150 B2 * 9/2017 Wu ..................... G06K 9/0004
10,002,281 B2 * 6/2018 Wu ..................... G06K 9/0004
(Continued)

OTHER PUBLICATIONS

Rowe et al. "Multispectral Fingerprint Image Acquisition" Springer, New York, USA, 2008 pp. 3-23. (Year: 2008).*
(Continued)

*Primary Examiner* — Andrae S Allison
(74) *Attorney, Agent, or Firm* — JCIPRNET

(57) ABSTRACT

An image capturing apparatus includes a light transmitting cover, a display panel, a Light guiding member, a light emitting element, and an image capturing element. The light transmitting cover has a surface in contact with the environmental medium. The light emitting element is disposed on one side of the Light guiding member. The sensing light beam is transmitted to the light penetrating portion in the first light guiding portion to be projected to the display area of the light transmitting cover, and a portion of the sensing light beam is totally reflected by the surface to form a signal beam that enters the second light guiding portion from the light penetrating portion. The image capturing element is disposed on the other side of the Light guiding member to receive the signal light beam that is transmitted in the second light guiding portion.

21 Claims, 6 Drawing Sheets

Related U.S. Application Data which is a continuation-in-part of application No. 15/662,238, filed on Jul. 27, 2017, now Pat. No. 10,002,281, which is a continuation-in-part of application No. 14/973,686, filed on Dec. 27, 2015, now Pat. No. 9,754,150, which is a continuation-in-part of application No. 15/588,700, filed on May 8, 2017.

(60) Provisional application No. 62/190,267, filed on Jul. 9, 2015, provisional application No. 62/563,045, filed on Sep. 25, 2017, provisional application No. 62/574,222, filed on Oct. 19, 2017, provisional application No. 62/371,230, filed on Aug. 5, 2016, provisional application No. 62/413,974, filed on Oct. 27, 2016.

(56) References Cited

U.S. PATENT DOCUMENTS

| | | | | |
|---|---|---|---|---|
| 10,147,757 B2 * | 12/2018 | Lee | | G06K 9/0004 |
| 10,331,939 B2 * | 6/2019 | He | | G06K 9/0012 |
| 10,354,116 B2 * | 7/2019 | Dattalo | | G06K 9/001 |
| 2010/0208952 A1 * | 8/2010 | Wu | | G06K 9/00046 |
| | | | | 382/124 |
| 2012/0105614 A1 * | 5/2012 | Wu | | G06K 9/00046 |
| | | | | 348/77 |
| 2013/0051635 A1 * | 2/2013 | Wu | | G06K 9/00046 |
| | | | | 382/124 |
| 2014/0125788 A1 * | 5/2014 | Wu | | G06K 9/00046 |
| | | | | 348/77 |
| 2016/0132712 A1 * | 5/2016 | Yang | | G06K 9/0002 |
| | | | | 348/77 |
| 2016/0139328 A1 * | 5/2016 | Hikmet | | F21S 43/145 |
| | | | | 362/84 |
| 2016/0224816 A1 * | 8/2016 | Smith | | G02B 27/58 |
| 2016/0247010 A1 * | 8/2016 | Huang | | G02B 5/20 |
| 2016/0357013 A1 * | 12/2016 | Watanabe | | G02B 1/11 |
| 2016/0379039 A1 * | 12/2016 | Dagan | | G06F 3/0412 |
| | | | | 382/124 |
| 2017/0017824 A1 * | 1/2017 | Smith | | G02B 5/005 |
| 2017/0109561 A1 * | 4/2017 | Wyrwas | | G06K 9/00046 |
| 2017/0220844 A1 * | 8/2017 | Jones | | G06K 9/0053 |
| 2017/0228580 A1 * | 8/2017 | Li | | G06K 9/0004 |
| 2017/0270342 A1 * | 9/2017 | He | | G06F 3/042 |
| 2018/0018494 A1 * | 1/2018 | Wu | | G06K 9/00046 |
| 2018/0041672 A1 * | 2/2018 | Yu | | H04N 5/2254 |
| 2018/0041674 A1 * | 2/2018 | Wu | | G02B 6/0018 |
| 2018/0268194 A1 * | 9/2018 | Lin | | G06K 9/0004 |

OTHER PUBLICATIONS

Cho, et al, "Embedded Nano-Si Optical Sensor in TFT-LCDs Technology and Integrated as Touch-Input Display" Digest of Technical Papers. vol. 42, No. 1., 2011, pp. 1818-1821. (Year: 2011).*

* cited by examiner

IMAGE CAPTURE APPARATUS

CROSS-REFERENCE TO RELATED PATENT APPLICATION

This application claims the benefit of priority to U.S. patent application Ser. No. 15/960,518, filed on Apr. 23, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an electronic device, and more particularly to an under-display image capture apparatus.

BACKGROUND OF THE DISCLOSURE

Conventional optical biometric devices can be used to detect and recognize faces, sounds, irises, retinas or fingerprints. Taking the fingerprint identification device as an example, the fingerprint identification device can be applied to an electronic product (such as a smart phone or a tablet computer) to identify the user.

In existing electronic products, a light beam generated by a display panel is generally used as a sensing light source for fingerprint recognition. The aforementioned display panel is, for example, an organic light emitting diode display panel. In the conventional fingerprint identification device applied to electronic products, when a light transmitting plate located at the outermost side thereof is pressed with a finger of a user, the light beam generated by the display panel is projected onto the light transmitting plate. After the total reflection of the interface between the light transmitting plate and the environmental medium (i.e., the outer surface of the light transmitting plate) is generated, the light beam is then received by the image sensor.

Since the finger has a plurality of irregular ridges and valleys, when the user places the finger on the light transmitting element, the ridges will contact the light transmitting element, while the valleys will not contact the light transmitting element. Therefore, the ridges contacting the light transmitting element may destroy the total reflection of the light beam in the light transmitting element, while the valleys not contacting the light transmitting element will not affect the total reflection of the light beam, so that the fingerprint pattern captured by the image sensor has dark lines corresponding to the ridges and bright lines corresponding to the valleys. Subsequently, the fingerprint pattern captured by the image sensor is processed by the image processor to further determine the identity of the user.

However, when the conventional fingerprint identification device is integrated with the thin film transistor liquid crystal display, the light beam generated by the backlight module of the thin film transistor liquid crystal display is diffused by the diffusion sheet before being projected onto the light transmitting plate. In this way, when the fingerprint image is captured, the light beam projected onto the light transmitting plate is relatively uneven, and the obtained fingerprint image is relatively blurred, which affects the accuracy of the identification.

A light-emitting element is additionally provided in the related art to generate a light beam for recognizing the fingerprint. After the light beam generated by the light-emitting element enters the light transmitting element, the light beam is totally reflected in the light transmitting member multiple times. When the user presses the outer surface of the light transmitting element with a finger, the image sensor can capture the fingerprint pattern.

However, contaminants such as particles or dust may easily be attached onto the outer surface of the light transmitting element, so that the total reflection of the light beam in the light transmitting element is broken. Therefore, before the beam is transmitted to the position where the finger is pressed, a part of the beam is lost, thereby affecting the image quality of the image sensor.

SUMMARY OF THE DISCLOSURE

In response to the above-referenced technical inadequacies, the present disclosure provides an image capture apparatus capable of avoiding the problem of affecting the image quality due to the attachment on the outer surface of a light transmitting element.

In one aspect, the present disclosure provides an image capture apparatus including: a light transmitting cover, a display panel, a light guiding member, a light emitting element, and an image capture apparatus. The light transmitting cover has a surface in contact with the environmental medium and the surface has a display area. The display panel corresponding to the display area is disposed under the light transmitting cover. The light guiding member is disposed between the display panel and the light transmitting cover. The light guiding member is divided into a first light guiding portion, a second light guiding portion, and a light penetrating portion. The display area overlaps the light penetrating portion in a vertical direction, and the first light guiding portion and the second light guiding portion are respectively located at opposite sides of the light penetrating portion. The light emitting element is disposed on one side of the light guiding member and is configured to generate a sensing light beam that enters the first light guiding portion. The sensing light beam is transmitted to the light penetrating portion in the first light guiding portion to be projected to the display area of the light transmitting cover, and a portion of the sensing light beam is totally reflected by the surface to form a signal light beam entering the second light guiding portion by the light penetrating portion. The image capture apparatus is disposed on the other side of the light guiding member to receive the signal light beam that is transmitted in the second light guiding portion.

In one aspect, the present disclosure provides an image capture apparatus, including: a light transmitting cover, a display panel, a first reflecting layer, a second reflecting layer, a light emitting element, and an image capturing element. The light transmitting cover has a surface in contact with the environmental medium, and the surface has a display area. The display panel is disposed under the light transmitting cover and corresponds to the display area. The display panel includes at least a first substrate and a second substrate coupled to the first substrate, the first substrate having an upper surface facing the light transmitting cover and a lower surface opposite the upper surface. The first reflecting layer is disposed on the upper surface and has an opening. The second reflecting layer is disposed on the lower surface, and the first reflecting layer and the second reflecting layer at least partially overlap in a thickness direction of the first substrate. The light emitting element is disposed on one side of the display panel to generate a sensing light beam of the first substrate. The sensing light beam is transmitted to the opening through the first reflecting layer and the second reflecting layer, and is projected to the light transmitting cover, and a portion of the sensing light beam is totally reflected by the surface to form a signal beam. The image capturing element is disposed on the other side of the display panel to receive the signal beam.

In one aspect, the present disclosure provides an image capture apparatus including: a light transmitting cover, a display panel, a light guiding member, a light emitting element, and an image capturing element. The light transmitting cover has a surface in contact with the environmental medium, and the surface has a display area. The display panel corresponding to the display area is disposed under the light transmitting cover. The light guiding member is disposed between the display panel and the light transmitting cover, wherein the light guiding member is divided into a light guiding portion and a light penetrating portion. The light emitting element is disposed on one side of the light guiding member and is configured to generate a sensing light beam entering the light guiding portion. The sensing light beam is transmitted to the light penetrating portion in the light guiding portion to be projected onto the display area of the light transmitting cover, and a portion of the sensing light beam is totally reflected by the surface to form a signal that enters the light guiding member from the light penetrating portion. The image capture apparatus is disposed on the other side of the light guiding member to receive the signal light beam.

Therefore, one of the beneficial effects of the image capture apparatus of present disclosure is that, by adopting the technical features of "the light guiding member disposed between the display panel and the light transmitting cover is divided into the light guiding portion and the light penetrating portion" or "the first reflecting layer with an opening and the second reflecting layer are respectively disposed on and under the first substrate of the display panel," the sensing light beam can be transmitted mainly in the light guiding member or the first substrate to prevent substances from being attached to the surface of the light transmitting cover and affecting the image quality.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
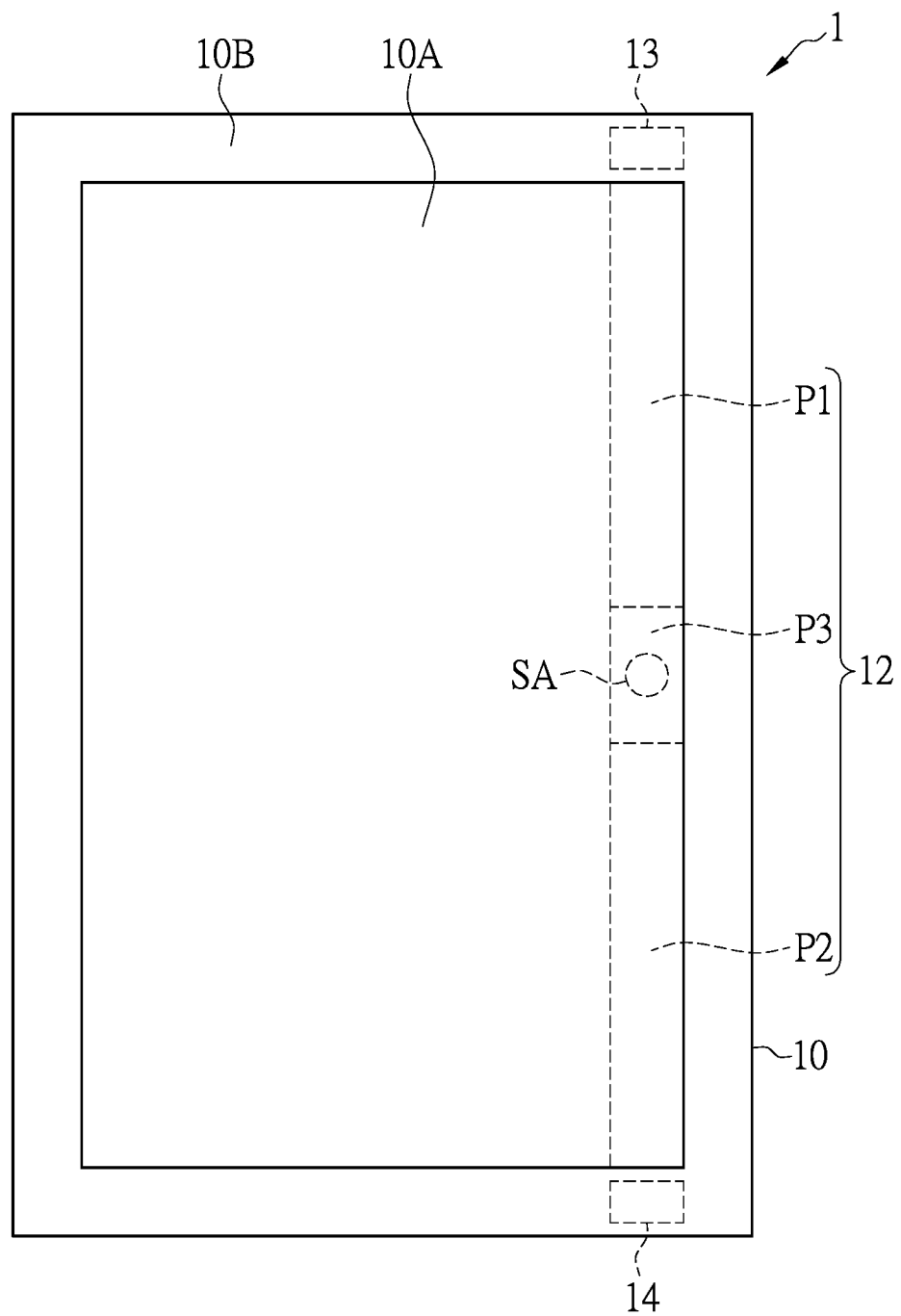
FIG. 1 is a top view of an image capture apparatus according to an exemplary embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various exemplary embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
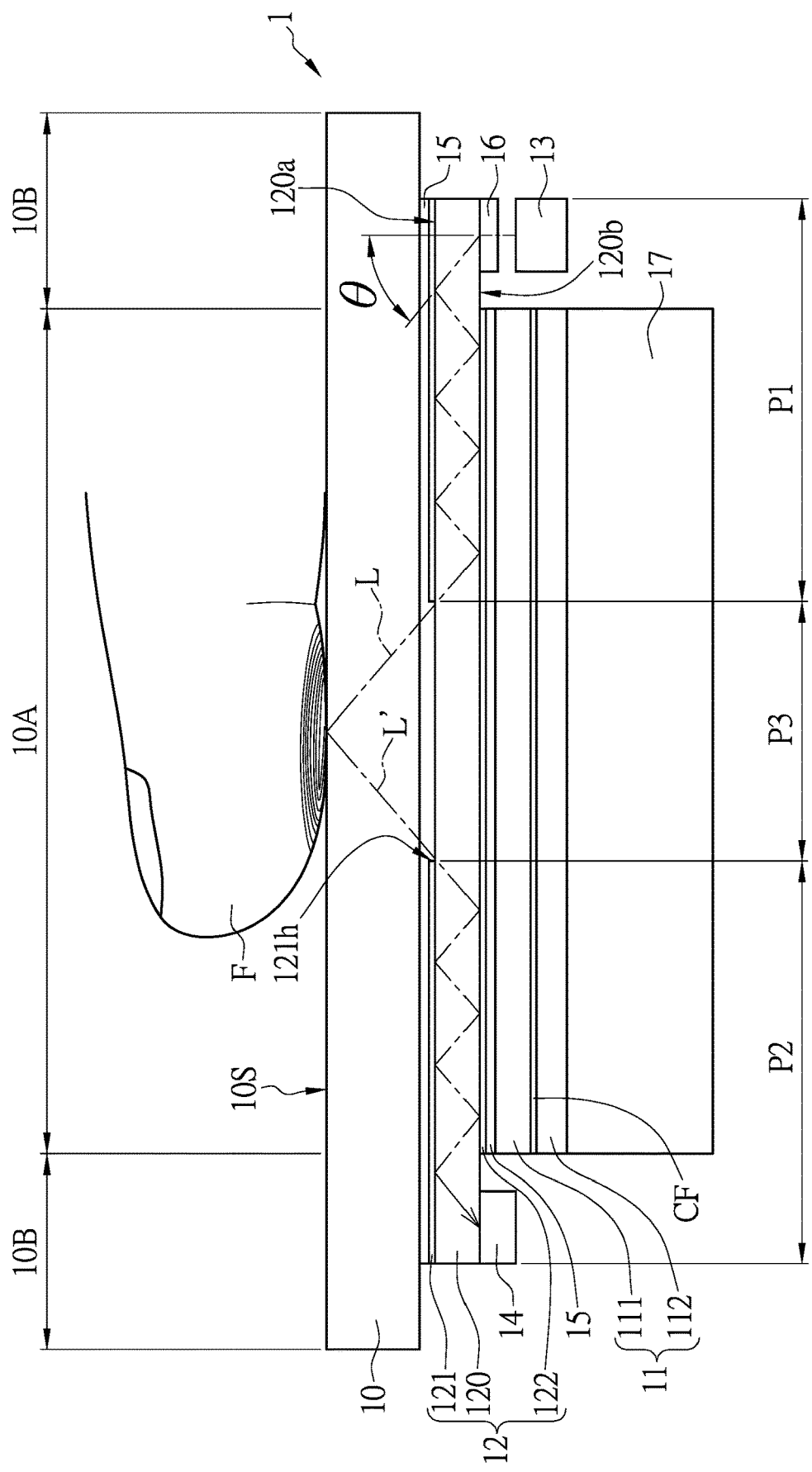
FIG. 2 is a partial sectional view of the image capture apparatus according to the exemplary embodiment of the present disclosure.

Reference is made to FIG. 1 and FIG. 2. FIG. 1 is a top view top view of an image capture apparatus according to an exemplary embodiment of the present disclosure. FIG. 2 is a partial sectional view of the image capture apparatus according to the embodiment of the present disclosure. The image capture apparatus provided in the present embodiment can be applied to an electronic product for capturing an image of an object F for identification. The aforementioned electronic product is, for example, a smart phone or a tablet. Further, the image capture apparatus of this embodiment is a screen capture apparatus.

Accordingly, the image capture apparatus 1 can be used in an environmental medium such as air, water or other kinds of environmental media. The object F is, for example, a user's finger, a palm, a wrist, or an eyeball; the image captured by the image capture apparatus 1 is, for example, a fingerprint, a palm print, a vein, a pupil, or an iris, but the present disclosure is not limit thereto. In the present disclosure, the fingerprint image is taken as an example to further illustrate the disclosure.

As shown in FIG. 2, the image capture apparatus 1 of an embodiment of the present disclosure includes a light transmitting cover 10, a display panel 11, a light guiding member 12, a light emitting element 13, and an image capturing element 14.

Referring to FIG. 1 and FIG. 2, the light transmitting cover 10 has a pressing surface 10S in contact with the environmental medium. In the present embodiment, the pressing surface 10S defines a display area 10A and a non-display area 10B. Furthermore the pressing surface 10S is used for contacting the object, and the pressing surface is used to obtain an image of the object. The object may be a fingerprint or a palm print, etc. When the image capture apparatus 1 is used to capture fingerprints and/or vein images, the pressing surface 10S of the light transmitting cover 10 can be touched or pressed by a finger for detection and identification. In the present embodiment, the material of the light transmitting cover 10 may be a rigid material or a flexible material. For example, the material of the light transmitting cover 10 may be selected from the group consisting of glass, polymethymethacrylate (PMMA), polycarbonate (PC) or other suitable materials.

In the present embodiment, in order to allow the user to see the image displayed by the display panel 11 through the light transmitting cover 10, the material of the light transmitting cover 10 is transparent to visible light. That is, the transmittance of visible light to the light transmitting cover 10 is greater than 80%.

Referring to FIG. 2, the display panel 11 corresponding to the display area 10A is disposed under the light transmitting cover 10 for displaying. The display panel 11 can be a rigid panel or a flexible panel. The display panel can be an organic light emitting diode display panel, a liquid crystal display panel or a display panel with a touch electrode (that is, having a touch function) and so on, the present disclosure is not limited thereto.

In this exemplary embodiment, the display panel 11 includes at least a first substrate 111 and a second substrate 112 coupled to the first substrate 111. When the display panel 11 is a thin film transistor liquid crystal display panel, the first substrate 111 is a color filter array substrate. That is, the display panel 11 further has a color filter layer CF disposed on the first substrate 111. The second substrate 112 is a thin film transistor array substrate. In addition, the display panel 11 further includes a display medium between the first substrate 111 and the second substrate 112, such as a liquid crystal layer.

When the display panel 11 is a thin film transistor liquid crystal display panel, the image capture apparatus 1 further includes a backlight assembly 17, and the display panel 11 is disposed on the backlight assembly 17. The backlight assembly 17 includes a light-emitting element (not shown) and an optical film group (not shown). The optical film group can be used to uniformly diffuse and project a light beam generated by the light-emitting element to the display panel 11. In this embodiment, the light beam produced by the light-emitting element is a visible light beam.

Referring to FIG. 2, the light guiding member 12 of the present embodiment is disposed between the display panel 11 and the light transmitting cover 10. The light guiding member 12 is divided into a first light guiding portion P1, a second light guiding portion P2, and a light penetrating portion P3. The first light guiding portion P1 and the second light guiding portion P2 are located respectively at opposite sides of the light penetrating portion P3.

Referring to FIG. 1, it should be noted that in the present exemplary embodiment, the display area 10A of the light transmitting cover 10 and the light penetrating portion P3 overlap in a vertical direction. In addition, the first light guiding portion P1 and the second light guiding portion P2 also overlap the display area 10A in the vertical direction.

Further, a sensing light beam L transmitted in the first light guiding portion P1 is transmitted to the light penetrating portion P3 to be projected to the display area 10A of the light transmitting cover 10. That is, the sensing light beam L in the first light guiding portion P1 of the light guiding member 12 is reflected at least once to be transmitted to the light penetrating portion P3.

The sensing light beam L forms a signal beam L' by total reflection of the pressing surface 10S of the light transmitting cover 10. The signal beam L' is passed into the second light guiding portion P2 by the light penetrating portion P3, and is transmitted to the image capturing element 14 at least once.

Referring to FIG. 2, in the present embodiment, the aforementioned sensing light beam L is generated by the light emitting element 13. The light emitting element 13 is, for example, a light emitting diode. In the present embodiment, the light emitting element 13 is an infrared light emitting element, and thus the sensing light beam L is infrared light. In the embodiment, the peak wavelength of the sensing light beam L may be in the range of 800 nm to 900 nm.

In the present embodiment, the light emitting element 13 is disposed on one side of the light guiding member 12 and is configured to generate a sensing light beam L that enters the first light guiding portion P1. That is, the light emitting element 13 is disposed on the side closer to the first light guiding portion P1 and disposed under the non-display area 10B of the light transmitting cover 10.

Further, in the present embodiment, the image capture apparatus 1 further includes a light beam directional element 16. The light beam directional element 16 can be an optical lens element, a secondary element, a grating, an optical microstructure layer, a diffractive element, or a combination thereof, and the present disclosure is not limited thereto. The light beam directional element 16 is disposed on the optical path of the sensing light beam L to adjust the incident angle θ of the sensing light beam L entering the first light guiding portion P1. Specifically, as shown in FIG. 2, the sensing light beam L generated by the light emitting element 13 passes through the light beam directional element 16 and enters the light guiding member 12 at a predetermined incident angle θ. In the present embodiment, the light beam directional element 16 is disposed between the light emitting element 13 and the light guiding member 12.

Figure 3:
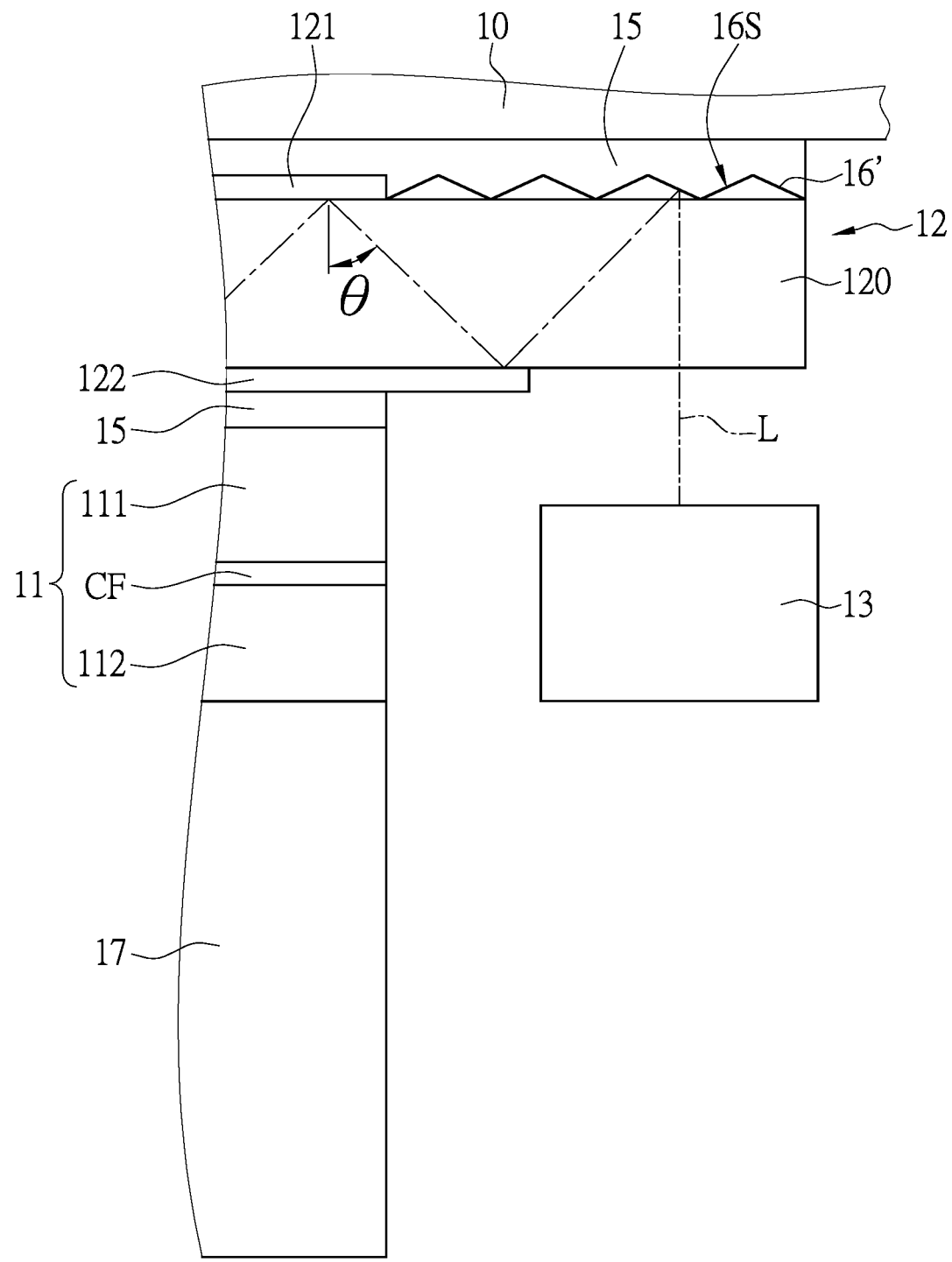
FIG. 3 is a partial enlarged view of a light beam directional element according to another exemplary embodiment of the present disclosure.

However, the present disclosure does not limit the structure and position of the light beam directional element 16, as long as the above objectives are achieved. Referring to FIG. 3, a partially enlarged schematic view of a light beam directional element of another exemplary embodiment of the present disclosure is shown. In the present embodiment, a light beam directional element 16' is an optical microstructure and the light beam directional element 16' has a reflecting surface 16S.

The light beam directional element 16' of this exemplary embodiment is disposed on the light guiding member 12, and the reflecting surface 16S corresponds to the light emitting surface of the light emitting element 13. Accordingly, the sensing light beam L generated by the light emitting element 13 is first incident on the light guiding member 12 via the light beam directional element 16', and then projected onto the reflecting surface 16S. Subsequently, the sensing light beam L enters the first light guiding portion P1 at a predetermined incident angle θ by reflection of the reflecting surface 16S, wherein the incident angle is between 45 degrees and 55 degrees.

Referring to FIG. 1 to FIG. 2, the image capturing element 14 is disposed on the other side of the light guiding member 12 to receive the signal light beam L' transmitted in the second light guiding portion P2. In detail, the image capturing element 14 is disposed on the side closer to the second light guiding portion P2 and located under the non-display area 10B of the light transmitting cover 10. In addition, it should be noted that in a possible embodiment of any of the illustrative embodiments of the present disclosure, a band pass filter layer is disposed between the image capturing element 14 and the light guiding member 12.

After the image capturing element 14 receives the signal light beam L', the signal light beam L' is converted into an electrical signal. In other words, the image capturing element 14 is a photoelectric conversion element, such as a Charge Coupled Device (CCD) or a Complementary Metal-Oxide Semiconductor (CMOS). However, in other embodiments, other image sensors may be used with image capturing element 14.

Based on the above mentioned, when the object F (e.g., a finger) contacts the pressing surface 10S of the light transmitting cover 10, the ridge of the finger contacts the pressing surface 10S, and a portion of the sensing light beam L projected onto the pressing surface 10S cannot cause total reflection, thereby the image capturing element 14 obtains a dark line corresponding to finger ridges. On the other hand, since finger valleys do not contact the pressing surface 10S of the light transmitting cover 10, the other portion of the sensing light beam L can still be totally reflected to form the signal light beam L'. The signal light beam L' is reflected by the second light guiding portion P2 and received by the image capturing element 14. Then, the received signal light beam L' is processed by an image processing element to obtain a fingerprint image between light and dark.

It should be noted that, due to the size limitation of the light penetrating portion P3, the sensing light beam L can only be projected to a partial range of the display area 10A. Similarly, the sensing light beam L will only enter the light penetrating portion P3 when it is totally reflected in a specific range, and will be transmitted to the image capturing element 14 by the second light guiding portion P2.

Accordingly, as shown in FIG. 1, in the present embodiment, the display area 10A will have a sensing range SA corresponding to the light penetrating portion P3. Therefore, only the object F located within the sensing range SA is illuminated by the sensing light beam L and forms a signal light beam L' by the light penetrating portion P3 and second light guiding portion P2. In other words, when the user places a finger in another area outside the sensing range SA, the image capturing element 14 will not receive the signal light beam L'.

Accordingly, by limiting the size and position of the light penetrating portion P3 of the light guiding member 12, and the incident angle θ of the sensing light beam L, the magnitude and position of the sensing range SA can be defined. In the embodiment, the maximum width of the light penetrating portion P3 may be greater than the maximum width of the sensing range SA.

Figure 4:
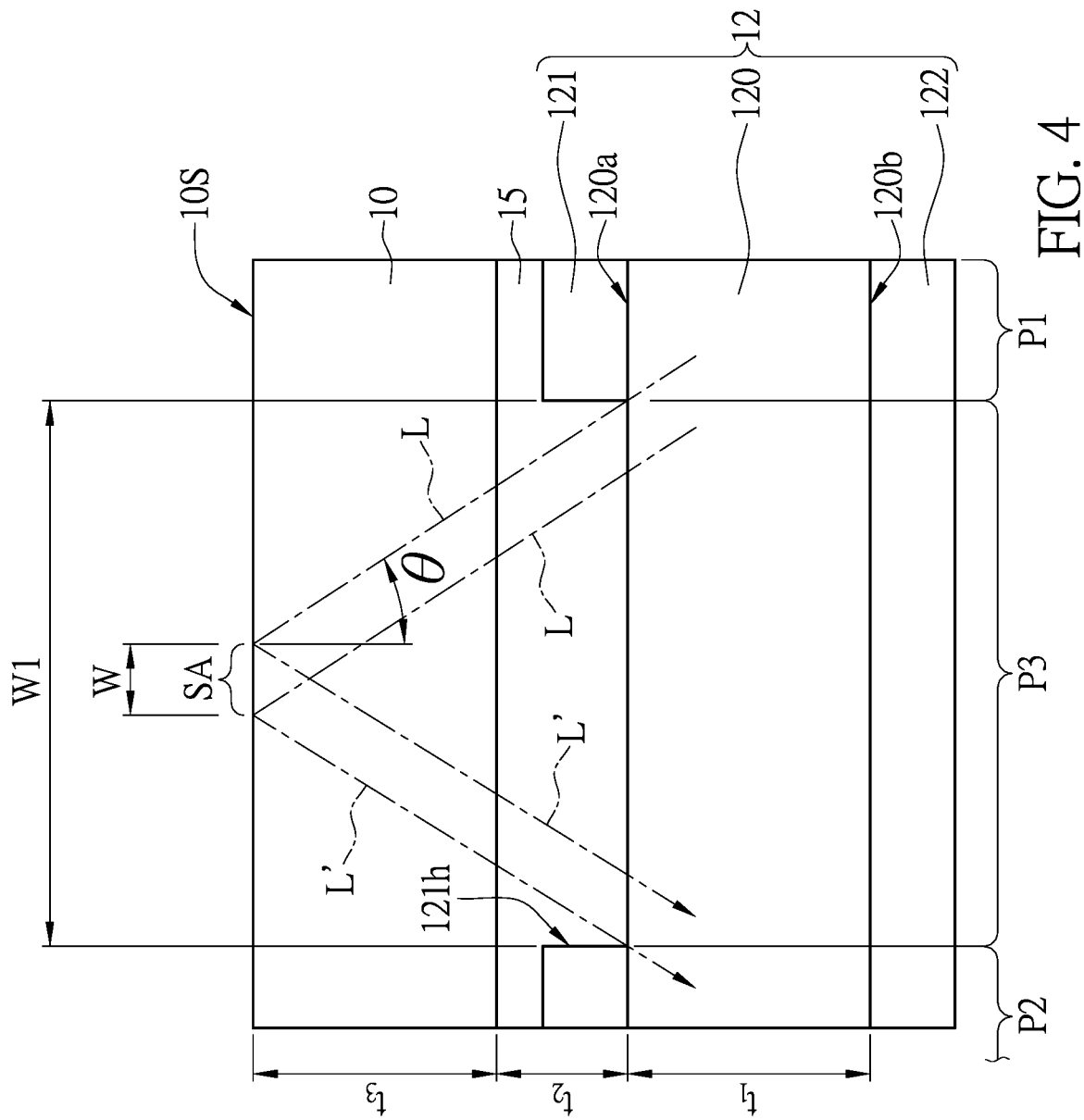
FIG. 4 is a partial enlarged view showing a light penetrating portion of the image capture apparatus of the exemplary embodiment of the present disclosure.

Referring to FIG. 2 to FIG. 4, FIG. 4 is a partial enlargement view showing a light penetrating portion of an image capture apparatus according to the embodiment of the present disclosure. In the present embodiment, the light guiding member 12 includes a light guiding body 120, a first reflecting layer 121, and a second reflecting layer 122. The light guiding body 120 has a first surface 120a and a second surface 120b opposite to the first surface 120a, and the light guiding body 120 is disposed with the first surface 120a facing toward the light transmitting cover 10.

In the present exemplary embodiment, the first reflecting layer 121 is disposed on the first surface 120a and has an opening 121h, and the second reflecting layer 122 is disposed on the second surface 120b. In other words, the first reflecting layer 121 and the second reflecting layer 122 are respectively located on opposite sides of the light guiding body 120.

As shown in FIG. 2, the first reflecting layer 121 and the second reflecting layer 122 overlap with each other in the vertical direction to define at least the aforementioned first light guiding portion P1 and second light guiding portion P2. In addition, the opening 121h of the first reflecting layer 121 and the second reflecting layer 122 overlap with each other in the vertical direction to define the aforementioned light penetrating portion P3. In addition, the opening 121h and the display area 10A overlap with each other in the thickness direction of the light guiding body 120.

In an embodiment, the refractive index of the first reflecting layer 121 and the refractive index of the second reflecting layer 122 are both lower than the refractive index of the light guiding body 120. For example, if the refractive index $n_L$ of the light guiding body 120 is approximately 1.4, the material of the first reflecting layer 121 and the second reflecting layer 122 may be selected from a material with a refractive index $n_R$ less than 1.4, such as a methyl low refractive silicone. By controlling the incident angle θ of the sensing light beam L entering the light guiding body 120, the sensing light beam L can be totally reflected in the light guiding body 120 multiple times.

Accordingly, in the present embodiment, the sensing light beam L entering the first light guiding portion P1 is transmitted to the light penetrating portion by at least one total reflection. Similarly, the signal light beam L' entering the second light guiding portion P2 through the light penetrating portion P3 can also be received by the image capturing element 14 by at least one total reflection.

Assuming that the first reflecting layer 121 and the second reflecting layer 122 have the same refractive index, the refractive index $n_R$ of the first reflecting layer 121 (or the second reflecting layer 122), the refractive index $n_L$ of the light guiding body 120, and the incident angle θ of the sensing light beam L entering the light guiding body 120 satisfy the following relationship: $\theta > \sin^{-}(n_L/n_R)$.

As shown in FIG. 2, the image capture apparatus 1 of the present embodiment further includes an optical adhesive 15. The optical adhesive 15 is located between the first reflecting layer 121 and the light transmitting cover 10, and a portion of the optical adhesive 15 is filled in the opening 121h.

In the present embodiment, the refractive index of the optical adhesive 15, the refractive index of the light guiding body 120, and the refractive index of the light transmitting cover 10 are made to be substantially the same by selecting a suitable material. Therefore, it is possible to prevent the sensing light beam L from being refracted when entering the light transmitting cover 10 or prevent the signal light beam L' from being refracted when entering the light guiding body 120 through the light penetrating portion P3.

The image capture apparatus 1 of the present embodiment further includes another optical adhesive 15 disposed between the display panel 11 and the light guiding member 12, so that the light guiding member 12 can be combined with the display panel 11 through the optical adhesive 15.

In addition, referring to FIG. 4, the light penetrating portion P3 corresponds to the sensing range SA of the display area 10A. A maximum width W of the sensing range SA is smaller than a maximum width of the light penetrating portion P3, that is, smaller than a maximum width W1 of the opening 121h.

Further, as shown in FIG. 4, in the present exemplary embodiment, the maximum width W1 of the opening 121h, the maximum width W of the sensing range SA, a thickness $t_1$ of the light guiding body 120, and a shortest vertical distance between the light guiding body 120 and the light transmitting cover 10 $t_2$ (that is, the thickness of the optical adhesive 15 located in the opening 121h), a thickness $t_3$ of the light transmitting cover 10, and the incident angle θ of the sensing light beam L satisfy the following relationship: $2(t_1+t_2+t_3)\tan\theta > W1 > W + 2(t_2+t_3)\tan\theta$.

It should be noted that in the present embodiment, the backlight assembly 17 of the image capture apparatus 1 is used to generate a visible light beam. Therefore, the visible light beam of the light guiding member 12 and the light transmitting cover 10 has a transmittance of more than 80%, so that the user can see the image displayed by the display panel 11 in the display area 10A.

In another exemplary embodiment, the sensing light beam L is infrared light, and the first reflecting layer 121 and the second reflecting layer 122 are both infrared light reflecting films. It is should be noted that the material of the first reflecting layer 121 and the second reflecting layer 122 may be selected from materials with high reflectance for infrared light but high transmittance for visible light.

For example, the infrared light reflecting film may be a dielectric multilayer film formed by alternately stacking a high refractive index material layer and a low refractive index material layer. Common high refractive index materials are, for example, titanium oxide ($TiO_2$, $Ti_3O_5$) or tantalum oxide ($Ta_2O_5$). Common low refractive index materials are, for example, lanthanum oxide ($SiO_2$) or magnesium fluoride ($MgF_2$). Also, materials are sometimes combined with medium refractive materials such as Alumina ($Al_2O_3$) or zirconia ($ZrO_2$).

It should be noted that the present disclosure is not limited to the above embodiment as long as the sensing light beam L and the signal light beam L' can be transmitted in the first light guiding portion P1 and the second light guiding portion P2. For example, in other embodiments, one of the first reflecting layer 121 and the second reflecting layer 122 is the infrared light reflecting film, and the other layer is selected from a material with a refractive index lower than that of the light guiding body 120. The purpose of the present disclosure can also be achieved by controlling the incident angle θ of the sensing light beam L projected onto the first reflecting layer 121 or the second reflecting layer 122.

Compared with the conventional fingerprint identification device, in the present embodiment, by the cooperation of the first reflecting layer 121 and the second reflecting layer 122, the sensing light beam L and the signal light beam L' can be mainly transmitted in the light guiding body 120 under the light transmitting cover 10. In addition, a specific sensing range SA can be defined in the display area 10A of the light transmitting cover 10 by the first reflecting layer 121 having the opening 121h. Therefore, it is possible to avoid the problem that stains on the pressing surface 10S of the light transmitting cover 10 may cause the strength of the sensing light beam L to decrease and the image quality to be lowered.

Figure 5:
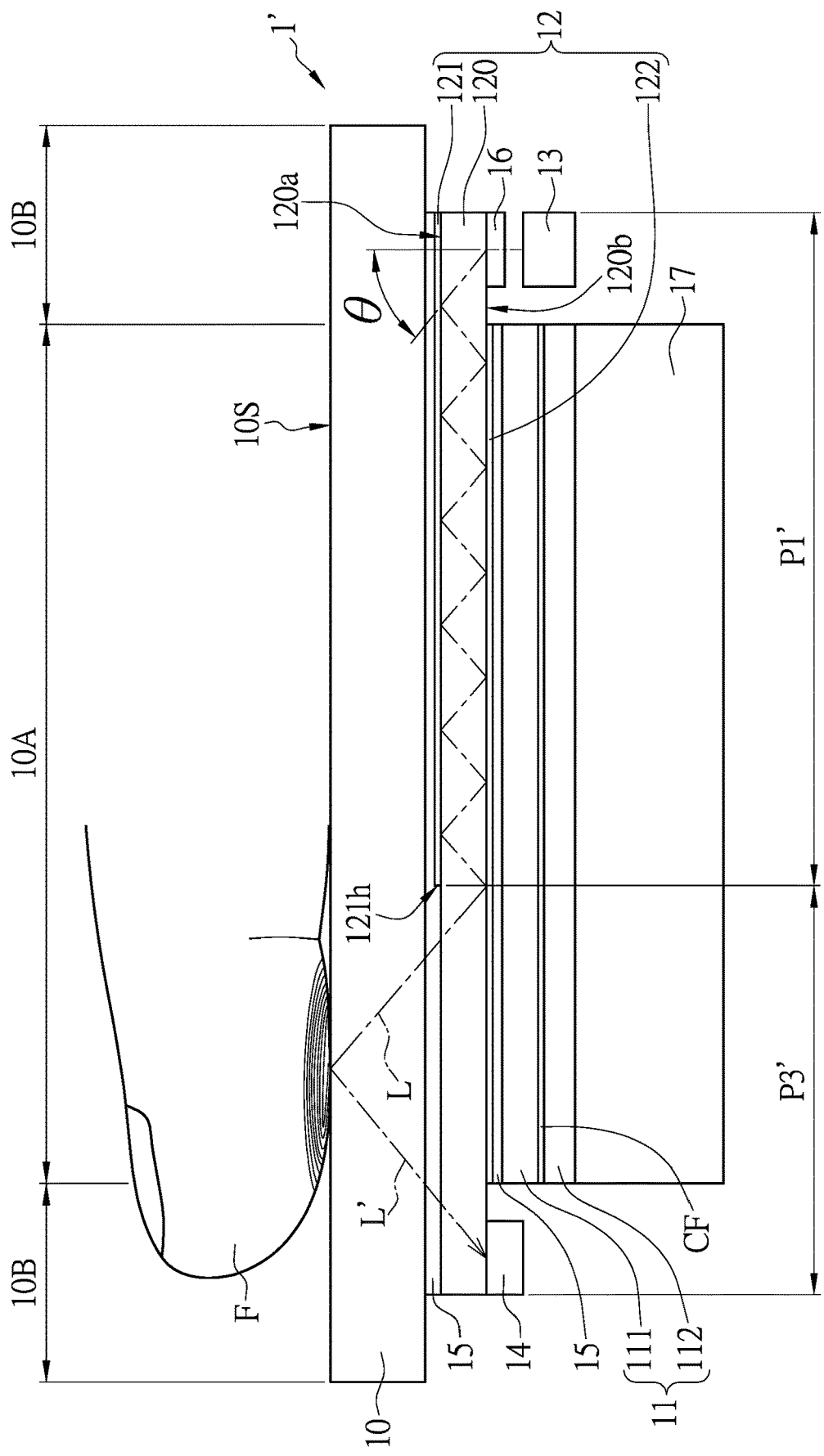
FIG. 5 is a partial sectional view of the image capture apparatus according to another exemplary embodiment of the present disclosure.

Referring to FIG. 5, a partial sectional view of an image capture apparatus of another exemplary embodiment of the present disclosure is shown. The same elements of the image capture apparatus 1' of the present embodiment and the image capture apparatus 1 of the previous embodiment have the same or similar reference numerals, and the same portions will not be described herein.

In the present embodiment, the opening 121h of the first reflecting layer 121 overlaps the display area 10A and the non-display area 10B in the vertical direction. Further, the opening 121h may extend from the top of the display panel 11 to the top of the image capturing element 14.

According to the above mentioned, the light guiding member 12 of the present embodiment can be divided into a light transmitting portion P1' and a light penetrating portion P3'. In the overhead direction, the light penetrating portion P3' will overlap the display area 10A and the non-display area 10B above the image capturing element 14.

In addition, the light emitting element 13 is disposed adjacent to the light transmitting portion P1', and the image capturing element 14 is disposed adjacent to the light penetrating portion P3. Accordingly, the sensing light beam L generated by the light emitting element 13 can be transmitted to the light penetrating portion P3' through the light transmitting portion P1'.

In addition, the signal light beam L' formed by the sensing light beam L, after being totally reflected by the sensing range SA, can enter the image capturing element 14 directly through the light penetrating portion P3' without going through multiple reflections to enter the image capturing element 14. Therefore, the image capture apparatus 1' of the present embodiment can avoid the loss of the signal light beam L' during the transmitting process.

Figure 6:
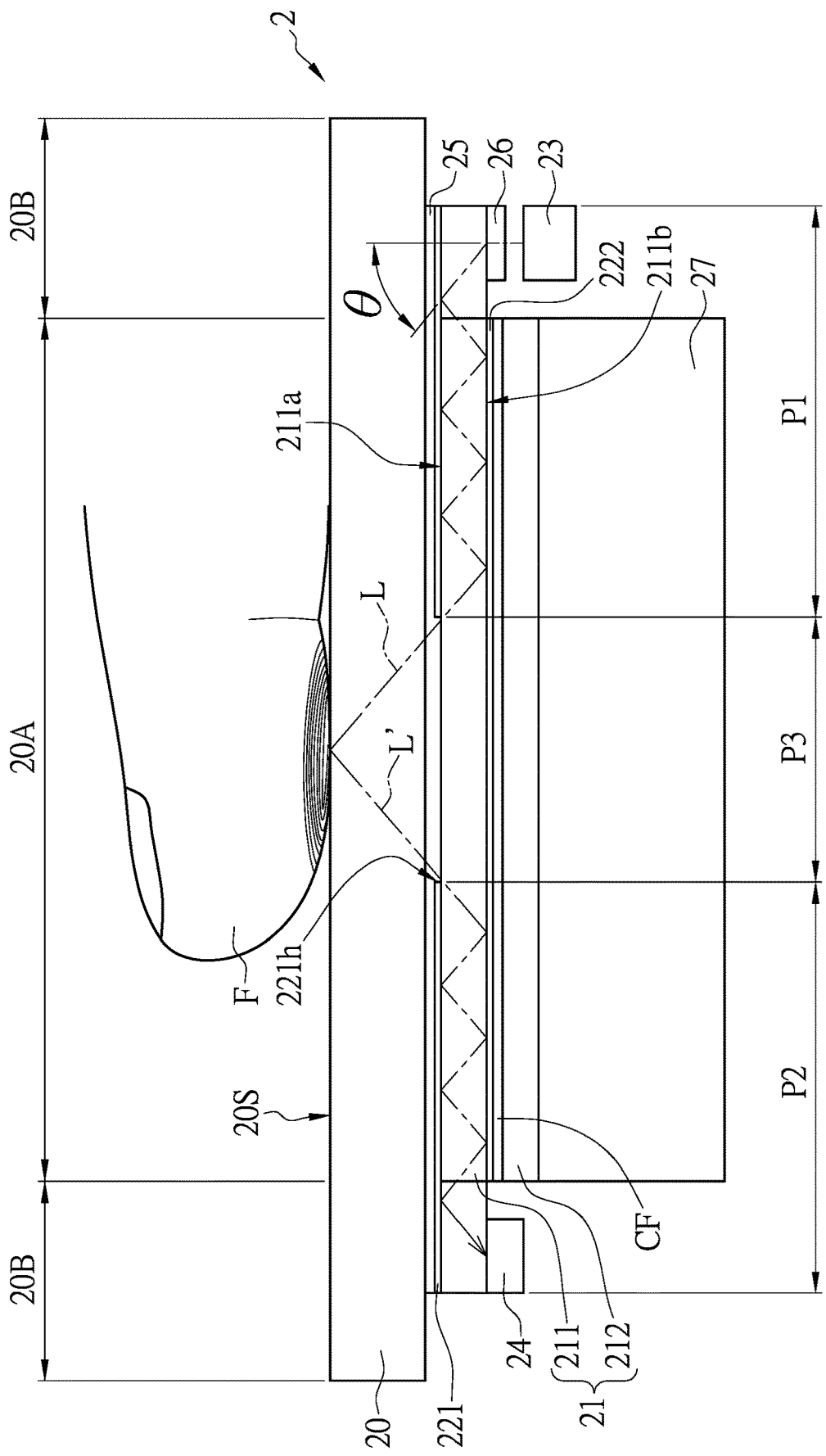
FIG. 6 is a partial sectional view of the image capture apparatus according to yet another exemplary embodiment of the present disclosure.

Referring to FIG. 6, a partial sectional view of an image capture apparatus according to still another exemplary embodiment of the present disclosure is shown. The image capture apparatus 2 of the present embodiment includes a light transmitting cover 20, a display panel 21, a first reflecting layer 221, a second reflecting layer 222, a light emitting element 23, and an image capturing element 24.

Similar to the exemplary embodiment of FIG. 2, the light transmitting cover 20 of this embodiment has a surface 20 in contact with an environmental medium, and the surface 20 defines a display area 20A and a non-display area 20B.

In the present embodiment, the sensing light beam L and the signal light beam L' are conducted through the first substrate 211 of the display panel 21. Therefore, the first reflecting layer 221 and the second reflecting layer 222 are opposite surfaces of the first substrate 211 disposed on the display panel 21.

Specifically, the first substrate 211 of the display panel 21 has an upper surface 211a facing the light transmitting cover 10 and a lower surface 211b opposite to the upper surface 211a. The first reflecting layer 221 having the opening 121h is disposed on the upper surface 211a, and the second reflecting layer 222 is disposed on the lower surface 211b.

The first reflecting layer 221 and the second reflecting layer 222 at least partially overlap in the thickness direction of the first substrate 211. Therefore, a portion in which the first reflecting layer 221 overlaps with the second reflecting layer 222 defines a first light guiding portion P1 and a second light guiding portion P2 on the first substrate 211. In addition, a portion of the opening 221h overlapping with the second reflecting layer 222 defines a light penetrating portion P3 in the first substrate 111. The first light guiding portion P1 and the second light guiding portion P2 are respectively located at opposite sides of the light penetrating portion P3.

In addition, in the present embodiment, the opening 221*h* of the first reflecting layer 221 overlaps only the display area 20A. However, in other embodiments, the opening 221*h* of the first reflecting layer 221 may also overlap the display area 20A and the non-display area 20B at the same time, or only overlap the non-display area 20B.

The light emitting element 23 is disposed on one side of the display panel 21 to generate a sensing light beam L entering the first substrate 211. The sensing light beam L is transmitted to the opening 221*h* through the first reflecting layer 221 and the second reflecting layer 222, and is projected to the light transmitting cover 20. The sensing light beam L is totally reflected by the surface 20 of the light transmitting cover 20 to form a signal light beam L'.

The image capturing element 24 is disposed on the other side of the display panel 21 to receive the signal light beam L'. In the present embodiment, after the signal light beam L' enters the first substrate 211 through the opening 221*h*, it is transmitted to the image capturing element 24 in the second light guiding portion P2. However, in other embodiments, when the opening 221*h* is adjacent to the image capturing element 24, the signal light beam L' can enter the image capturing element 24 directly through the opening 221*h*. The material selection of the first reflecting layer 221 and the second reflecting layer 222, and the maximum width W1 of the opening 221*h* can be referred to in the previous description, and the description will not be repeated herein.

It should be noted that, in the embodiment, when the display panel 21 is a thin film transistor liquid crystal display panel, the display panel 21 further includes a color filter layer CF. The color filter layer CF is disposed on the lower surface 211*b* of the first substrate 211 and covers the second reflecting layer 222. In other words, the second reflecting layer 222 is located between the color filter layer CF and the first substrate 211.

In addition, the image capture apparatus 2 may further include a backlight assembly 27 to generate a visible light beam. Similar to the previous embodiment, the display panel 21 is disposed on the backlight assembly 27. In addition, the transmittance of the visible light beam to the first reflecting layer 221, the second reflecting layer 222, and the light transmitting cover 20 is greater than 80%. However, in other exemplary embodiments, when the display panel 21 is an organic light emitting diode panel, the backlight assembly 27 may also be omitted.

In addition, the terms "light transmitting portion", "first light guiding portion" or "second light guiding portion" in all embodiments of the present disclosure refers to the light guiding member 12 or the portion of the first substrate 211 allowing the transmission of the sensing light beam L and the signal light beam L'; the "light penetrating portion" refers to the portion of the light guiding member 12 or the first substrate 211 that allows the sensing light beam L and the signal light beam L' to enter and exit other components.

Therefore, when the sensing light beam L and the signal light beam L' are infrared light, the terms "light transmitting portion", "first light guiding portion" or "second light guiding portion" means that the light guiding member 12 or the first substrate 211 conducts infrared light. The "light penetrating portion" refers to a portion where the light guiding member 12 or the first substrate 211 can be penetrated by infrared light.

That is, the backlight assembly 17 and 27 of the image capture apparatus 1, 1', 2 or the visible light beams generated by the display panels 11, 21 themselves will not be reflected in the "light transmitting portion", "first light guiding portion" or the "second light guiding portion", which may affect the user's viewing of the display screen.

In addition, the image capture apparatuses 1, 1', 2 of the present embodiment may further include a band pass filter layer (not shown). In the embodiment shown in FIGS. 2 and 5, a band pass filter layer may be disposed between the image capturing element 14 and the light guiding member 12 to filter stray light other than the signal light beam L'.

For example, when the signal light beam L' is infrared light, the band pass filter layer has a transmittance of at least 80% for the signal light beam L' and a transmittance of less than 20% for visible light and ultraviolet light. Further, the band pass filter layer can be an infrared band pass filter layer, and allows a light beam with the wavelength falling within the range of 800 nm to 900 nm to pass, and filter the light beam with the wavelength falling outside the range of 800 nm to 900 nm. In other exemplary embodiments, the band pass filter layer may allow a beam of light with a wavelength falling within the range of 840 nm to 860 nm, or a beam of light with a wavelength falling within another range of 890 nm to 990 nm.

In the exemplary embodiment of FIG. 6, a band pass filter layer may be disposed between the image capturing element 24 and the first substrate 211. Therefore, the band pass filter layer can prevent ambient light and the light beams generated by the display panels 11, 21 or the backlight assemblies 17, 27 from entering the image capturing elements 14, 24, which may cause signal interference. Accordingly, the identification accuracy of the image capture apparatus 1, 1', 2 can be improved by providing the band pass filter layer.

In summary, one of the beneficial effects of the image capture apparatuses 1, 1', 2 of the present disclosure is that, by adopting the technical features of "a light guiding member disposed between the display panel and the light transmitting cover is divided into a light transmitting portion and a light penetrating portion" or "providing a first reflecting layer and a second reflecting layer having openings on the upper and lower sides of the first substrate of the display panel", the sensing light beam L can be mainly transmitted in the light guiding member 12 or the first substrate 211 under the light transmitting covers 10, 20, and the sensing range SA can be defined by the openings 121*h*, 221*h* of the first reflecting layers 121, 221 to prevent substances from being attached to the pressing surface 10S, 20S of the cover light transmitting cover 10, 20 and affecting the image quality.

Further, compared with the conventional fingerprint identification device, in the present embodiment, the sensing light beam L and the signal light beam L' are mainly transmitted by the light guiding member 12 under the light transmitting covers 10, 20 or the first substrate 211 of the display panel 21.

Therefore, it is possible to avoid the problem that stains on the pressing surfaces 10S, 20S of the light transmitting covers 10, 20 may cause the strength of the sensing light beam L to decrease and the image quality to be lowered. Accordingly, the image capture apparatuses 1, 1', 2 of the present embodiment can have better image quality.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An image capture apparatus comprising:
a light transmitting cover with a surface in contact with an environmental medium, wherein the surface has a display area;
a display panel disposed under the light transmitting cover and corresponding to the display area;
a light guiding member disposed between the display panel and the light transmitting cover, wherein the light guiding member is divided into a first light guiding portion, a second light guiding portion and a light penetrating portion; the display area overlaps the light penetrating portion in a vertical direction, and the first light guiding portion and the second light guiding portion are respectively located at opposite sides of the light penetrating portion; and
a light emitting element disposed on one side of the Light guiding member and configured to generate a sensing light beam entering the first light guiding portion, wherein the sensing light beam is transmitted to the light penetrating portion in the first light guiding portion to be projected to the display area of the light transmitting cover, and a portion of the sensing light beam is totally reflected by the surface to form a signal light beam entering the second light guiding portion by the light penetrating portion; and
an image capturing element disposed on the other side of the light guiding member to receive the signal light beam that is transmitted in the second light guiding portion.

2. The image capture apparatus according to claim 1, wherein the Light guiding member further includes:
a light guiding body with a first surface and a second surface opposite to the first surface, wherein the first surface faces the light transmitting cover;
a first reflecting layer disposed on the first surface, wherein the first reflecting layer has an opening; and
a second reflecting layer disposed on the second surface;
wherein the first reflecting layer and the second reflecting layer overlap each other in the vertical direction to define at least the first light guiding portion and the second light guiding portion, and the opening and the second reflecting layer overlap with each other in the vertical direction to define the light penetrating portion.

3. The image capture apparatus according to claim 2, wherein the refractive index of the first reflecting layer and the refractive index of the second reflecting layer are both lower than the refractive index of the light guiding body.

4. The image capture apparatus according to claim 2, wherein the refractive index $n_R$ of the second reflecting layer, the refractive index nL of the light guiding body, and the incident angle $\theta$ of the sensing light beam entering the light guiding body satisfy the following relationship: $\theta > \sin^{-1}(n_L/n_R)$.

5. The image capture apparatus according to claim 2, wherein the sensing light beam is infrared light, and the first reflecting layer and the second reflecting layer are both infrared light reflecting layers.

6. The image capture apparatus according to claim 2, further comprising an optical adhesive positioned between the first reflecting layer and the light transmitting cover, and a portion of the optical adhesive is filled into the opening.

7. The image capture apparatus according to claim 2, wherein a maximum width W1 of the opening, a thickness $t_1$ of the light guiding body, a shortest vertical distance $t_2$ between the light guiding body and the light transmitting cover, a thickness $t_3$ of the light transmitting cover, and the incident angle $\theta$ of the sensing light beam satisfies the following relationship: $2(t_1+t_2+t_3)\tan\theta > W$.

8. The image capture apparatus according to claim 1, wherein the display area has a sensing range corresponding to the light penetrating portion, and a maximum width of the sensing range is less than a maximum width of the light penetrating portion.

9. The image capture apparatus according to claim 1, further comprising a beam directing element disposed on the optical path of the sensing light beam to adjust an incident angle of the sensing light beam entering the first light guiding portion.

10. An image capture apparatus, comprising:
a light transmitting cover with a surface in contact with an environmental medium, wherein the surface has a display area;
a display panel disposed under the light transmitting cover and corresponding to the display area, and including at least a first substrate with an upper surface facing the light transmitting cover and a lower surface opposite to the upper surface and a second substrate coupled to the first substrate;
a first reflecting layer disposed on the upper surface and having an opening;
a second reflecting layer disposed on the lower surface, wherein the first reflecting layer and the second reflecting layer at least partially overlap in a thickness direction of the first substrate;
a light emitting element disposed on one side of the display panel to generate a sensing light beam entering the first substrate, wherein the sensing light beam is transmitted to the opening through the first reflecting layer and the second reflecting layer and projected onto the light transmitting cover, and a portion of the sensing light beam is totally reflected by the surface so as to form a signal light beam; and
an image capturing element disposed on the other side of the display panel to receive the signal beam.

11. The image capture apparatus according to claim 10, wherein the refractive index of the first reflecting layer and the refractive index of the second reflecting layer are both lower than the refractive index of the first substrate so as to cause total reflection of the sensing light beam.

12. The image capture apparatus according to claim 11, wherein the refractive index $n_R$ of the second reflecting layer, the refractive index $n_L$ of the first substrate and the incident angle $\theta$ of the sensing light beam projected onto the first reflecting layer satisfy the following relationship: $\theta > \sin^{-1}(n_L/n_R)$.

13. The image capture apparatus according to claim 10, wherein the sensing light beam is infrared light, and the first reflecting layer and the second reflecting layer are both infrared light reflecting layers.

14. The image capture apparatus according to claim 10, further comprising an optical adhesive positioned between the first reflecting layer and the light transmitting cover, and a portion of the optical adhesive is filled into the opening.

15. The image capture apparatus according to claim 10, wherein a maximum width W1 of the opening, a thickness $t_1$ of the first substrate, a shortest vertical distance $t_2$ between the first substrate and the light transmitting cover, a thickness $t_3$ of the light transmitting cover, and the incident angle $\theta$ of the sensing light beam satisfies the following relationship: $2(t_1+t_2+t_3) \tan \theta > W$.

16. The image capture apparatus according to claim 10, further comprising a beam directing element disposed between the light emitting element and the first substrate to adjust an incident angle of the sensing light beam entering the first substrate.

17. The image capture apparatus according to claim 10, wherein the opening and the display area overlap each other in the thickness direction, and the display area has a sensing range corresponding to the opening, and a maximum width of the sensing range is smaller than a maximum of the opening width.

18. The image capture apparatus according to claim 10, wherein the light transmitting cover further has a non-display area, the opening and the non-display area overlap with each other in the thickness direction, the non-display area has a sensing range corresponding to the opening, and a maximum width of the sensing range is smaller than the maximum width of the opening.

19. An image capture apparatus comprising:
   a light transmitting cover with a surface in contact with an environmental medium, wherein the surface has a display area;
   a display panel disposed under the light transmitting cover and corresponding to the display area;
   a light guiding member disposed between the display panel and the light transmitting cover, wherein the light guiding member is divided into a light guiding portion and a light penetrating portion;
   a light emitting element disposed on one side of the light guiding member and configured to generate a sensing light beam entering the first light guiding portion, wherein the sensing light beam is transmitted to the light penetrating portion in the first light guiding portion to be projected to the display area of the light transmitting cover, and a portion of the sensing light beam is totally reflected by the surface to form a signal light beam entering the second light guiding portion by the light penetrating portion; and
   an image capturing element disposed on the other side of the light guiding member to receive the signal light beam.

20. The image capture apparatus according to claim 19, wherein the light penetrating portion overlaps the display area in a vertical direction, the display area has a sensing range corresponding to the light penetrating portion, and a maximum width of the sensing range is smaller than a maximum width of the opening.

21. The image capture apparatus according to claim 20, wherein the light transmitting area further has a non-display area, the image capturing element is disposed under the non-display area, and the light penetrating portion overlaps the display area and the non-display area above the image capturing element in a vertical direction.

* * * * *